United States Patent
Newman

(10) Patent No.: US 11,443,409 B1
(45) Date of Patent: Sep. 13, 2022

(54) IMAGE CAPTURE DEVICE PROVIDING WARPED PREVIEWS

(71) Applicant: GoPro, Inc., San Mateo, CA (US)

(72) Inventor: David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 28 days.

(21) Appl. No.: 17/116,671

(22) Filed: Dec. 9, 2020

(51) Int. Cl.
*G06T 3/00* (2006.01)
*G06T 3/40* (2006.01)

(52) U.S. Cl.
CPC .......... *G06T 3/0093* (2013.01); *G06T 3/4038* (2013.01)

(58) Field of Classification Search
CPC ... G06T 3/0093; G06T 3/4038; H04N 5/2252; H04N 5/2253
See application file for complete search history.

(56) References Cited

U.S. PATENT DOCUMENTS

| | | | |
|---|---|---|---|
| 8,218,895 B1 * | 7/2012 | Gleicher | G06T 3/0025 348/556 |
| 2020/0356140 A1 * | 11/2020 | Kim | G06F 3/0482 |

OTHER PUBLICATIONS

Harris, Tom, "How Cameras Work", Sep. 29, 2012, https://web.archive.org/web/20120929132116/http://electronics.howstuffworks.com/camera.htm (Year: 2012).*

Nice, Karim et al, "How Digital Cameras Work", May 10, 2019, https://web.archive.org/web/20190510065408/https://electronics.howstuffworks.com/cameras-photography/digital/digital-camera.htm/printable (Year: 2019).*

Rowse, Darren, "Rule of Thirds", Oct. 25, 2019, https://web.archive.org/web/20191025151510/https://digital-photography-school.com/rule-of-thirds/ (Year: 2019).*

* cited by examiner

*Primary Examiner* — Michelle L Sams
(74) *Attorney, Agent, or Firm* — Esplin & Associates, PC

(57) ABSTRACT

An image capture device may capture visual content through a front-facing optical element. A portion of the visual content may be enlarged for presenting on a front-facing display of the image capture device. Extent of the visual content within the portion may be warped to increases size of depiction within the portion.

20 Claims, 9 Drawing Sheets

IMAGE CAPTURE DEVICE PROVIDING WARPED PREVIEWS

FIELD

This disclosure relates to an image capture device that provides warped previews of visual content.

BACKGROUND

An image capture device may include one or more displays to present information, such as preview of visual content being captured by the image capture device. Small size of the display(s) may make it difficult for a user to determine framing within the visual content.

SUMMARY

This disclosure relates to providing warped previews. An image capture device may include a housing. The housing may have multiple sides. The housing may carry one or more of an image sensor, an optical element, a display, and/or other components. The optical element may be carried on a first side of the housing. The optical element may guide light within a field of view to the image sensor. The image sensor may generate a visual output signal conveying visual information defining visual content based on light that becomes incident thereon. The display may be carried on the first side of the housing. The visual content may be captured during a capture duration. A portion-enlarged preview of the visual content may be presented on the display. The portion-enlarged preview of the visual content may include an enlarged portion. An extent of the visual content within the enlarged portion may be warped to increase size of depiction within the enlarged portion.

An electronic storage may store visual information defining visual content, information relating to visual content, information relating to portion-enlarged preview of visual content, information relating to warping of visual content, and/or other information.

The housing may have multiple sides. The housing carry one or more components of the image capture device. The housing may carry (be attached to, support, hold, and/or otherwise carry) one or more of an image sensor, an optical element, a display, a processor, an electronic storage, and/or other components. The optical element and the display may be carried on the same side of the housing. The optical element and the display may be carried on a first side of the housing. In some implementations, the housing may carry multiple displays. In some implementations, the housing may carry multiple image sensors and multiple optical elements.

The image sensor may be configured to generate a visual output signal and/or other output signals. The visual output signal may convey visual information based on light that becomes incident on the image sensor and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The processor(s) may be configured by machine-readable instructions. Executing the machine-readable instructions may cause the processor(s) to facilitate providing warped previews. The machine-readable instructions may include one or more computer program components. The computer program components may include one or more of a capture component, a preview component, and/or other computer program components.

The capture component may be configured to capture the visual content during one or more capture durations. The visual content may be captured through the optical element. In some implementations, the visual content may have the field of view.

The preview component may be configured to present a portion-enlarged preview of the visual content on a display. The display may be carried on the same side of the housing as the optical element. The portion-enlarged preview of the visual content may include an enlarged portion. An extent of the visual content within the enlarged portion may be warped to increase size of depiction within the enlarged portion. In some implementations, the portion-enlarged preview of the visual content may include entirety of the visual content.

In some implementations, the enlarged portion may be a center portion of the portion-enlarged preview of the visual content. In some implementations, the enlarged portion may be a non-center portion of the portion-enlarged preview of the visual content. In some implementations, the visual content may include a face, and position of the enlarged portion within the portion-enlarged preview of the visual content may be determined to include the face within the enlarged portion.

In some implementations, warping of the extent of the visual content within the enlarged portion may maintain rule of thirds within the portion-enlarged preview of the visual content.

In some implementations, the extent of the visual content within the enlarged portion may be presented using a first projection, and other extent of the visual content outside the enlarged portion may be presented using a second projection different than the first projection.

In some implementations, the portion-enlarged preview of the visual content may be presented on the display responsive to a face or a person being within the visual content captured during the capture duration.

In some implementations, the image capture device may further comprise another display carried on a second side of the housing. The portion-enlarged preview of the visual content may not be presented on the other display during presentation of the portion-enlarged preview of the visual content on the display. In some implementations, the other display may be deactivated during the presentation of the portion-enlarged preview of the visual content on the display.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
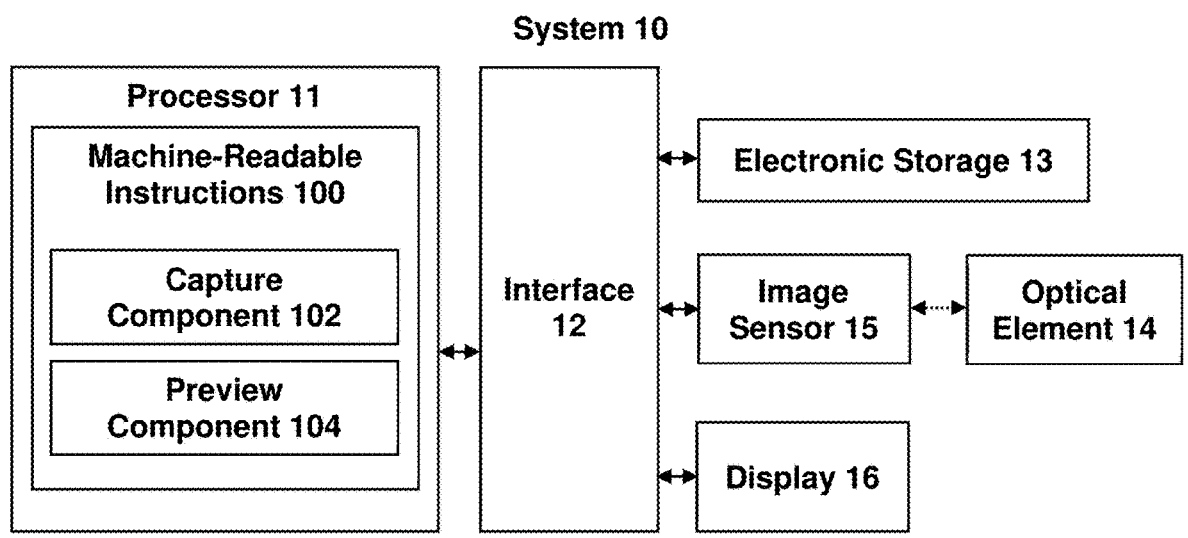
FIG. 1 illustrates an example system that provides warped previews.

FIG. 1 illustrates a system 10 for providing warped previews. The system 10 may include one or more of a processor 11, an interface 12 (e.g., bus, wireless interface), an electronic storage 13, an optical element 14, an image sensor 15, a display 16, and/or other components. The system 10 may include and/or be part of an image capture device. The image capture device may include a housing having multiple sides, and one or more of the optical element 14, the image sensor 15, the display 16, and/or other components of the system 10 may be carried by the housing of the image capture device. The optical element 14 and the display 16 may be carried on the same side of the housing. The optical element 14 may guide light within a field of view to the image sensor 15. The image sensor 15 may generate a visual output signal conveying visual information defining visual content based on light that becomes incident thereon.

The processor 11 may capture the visual content during a capture duration. A portion-enlarged preview of the visual content may be presented on the display 16. The portion-enlarged preview of the visual content may include an enlarged portion. An extent of the visual content within the enlarged portion may be warped to increase size of depiction within the enlarged portion.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to portion-enlarged preview of visual content, information relating to warping of visual content, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element 14, the image sensor 15, and/or the display 16 of the system 10 may be carried by the housing of the image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

Figure 3A:
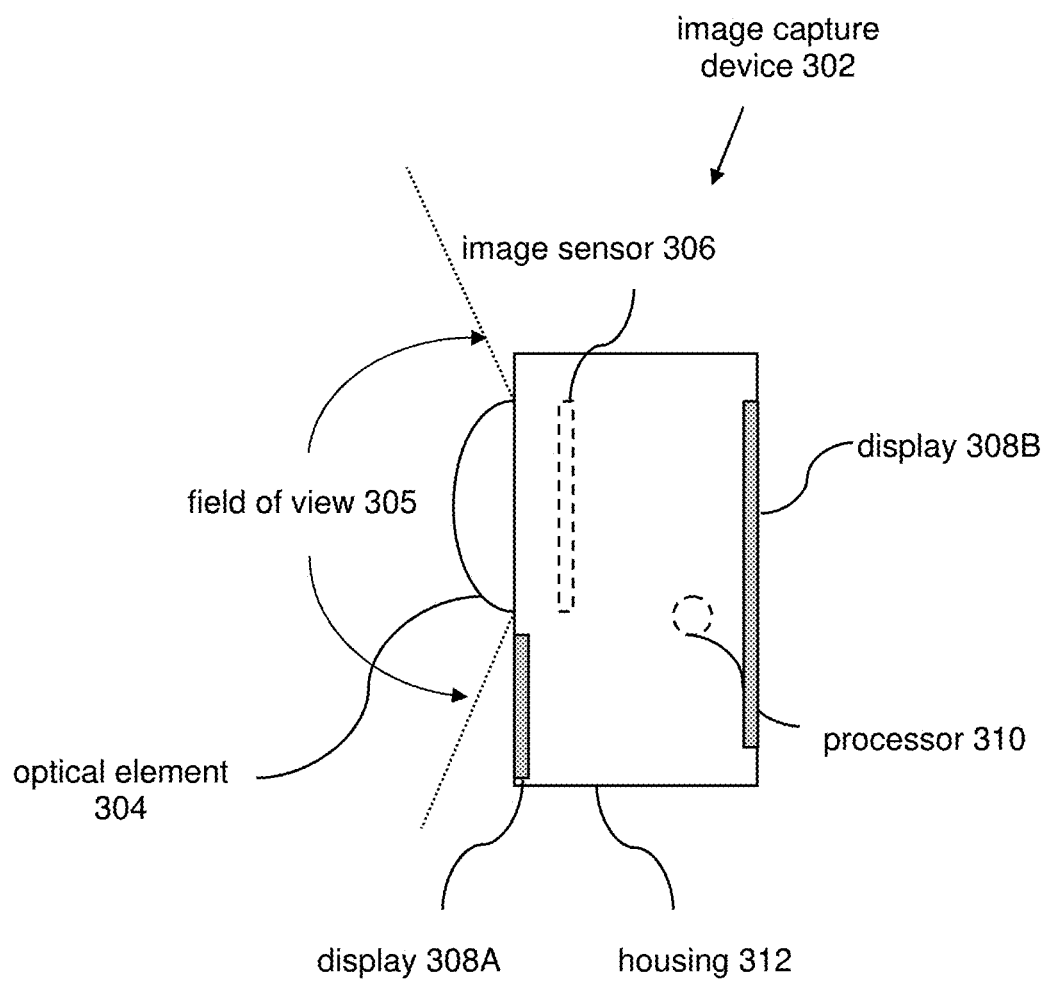
FIGS. 3A and 3B illustrate example image capture devices.

FIG. 3A illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may have multiple sides. The housing 312 carry one or more components of the image capture device 302. The housing 312 may carry (be attached to, support, hold, and/or otherwise carry) one or more of an optical element 304, an image sensor 306, a display 308A, a display 308B, a processor 310, and/or other components.

The optical element 304 and the display 308A may be carried on the same side of the housing 312. For example, the optical element 304 and the display 308A may be carried on a front side of the housing 312. The display 308A may be a front-facing display of the image capture device 302. In some implementations, the housing 312 may carry multiple displays, such as shown in FIG. 3A. The display 308B may be carried on a rear side of the housing 312. The display 308B may be a rear-facing display of the image capture device 302.

Figure 3B:
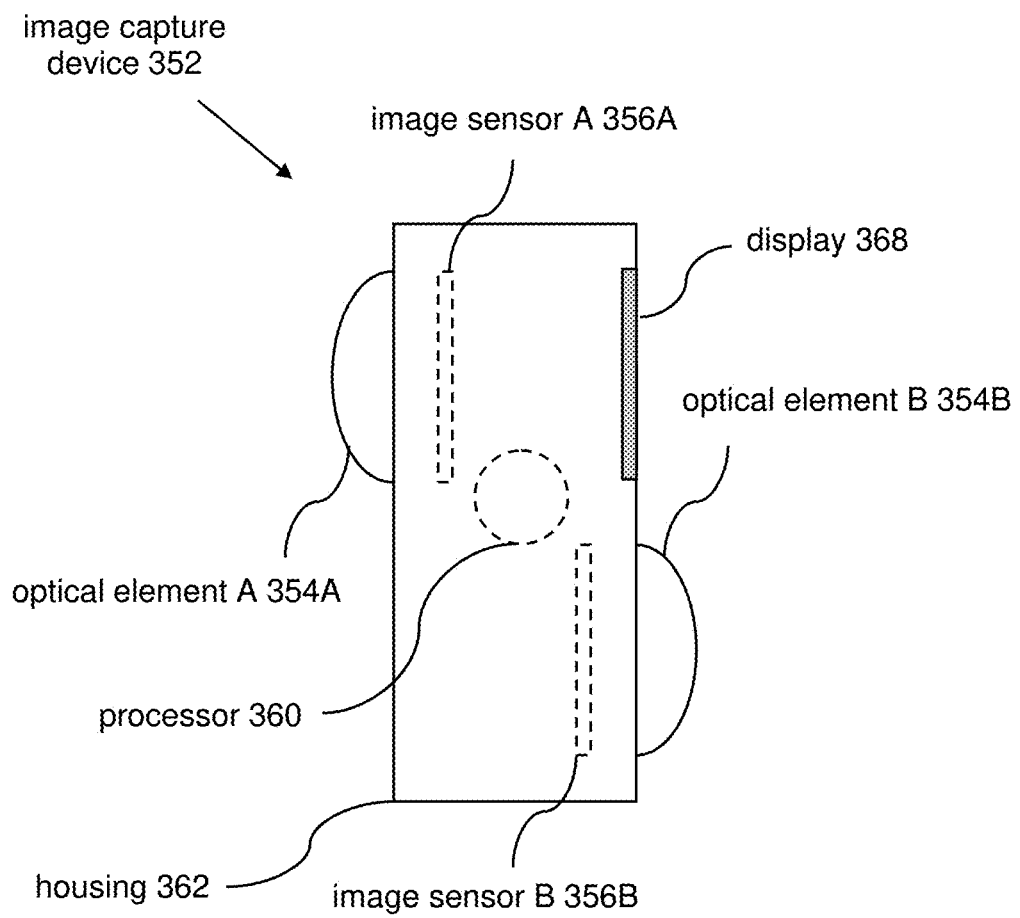

In some implementations, the housing may carry multiple image sensors and multiple optical elements. FIG. 3B illustrates an example image capture device 352. Visual content (e.g., of spherical image(s), spherical video frame(s)) may be captured by the image capture device 352. The image capture device 352 may include a housing 362. The housing 362 carry one or more components of the image capture device 352. The housing 362 may carry one or more of an optical element A 354A, an optical element B 354B, an image sensor A 356A, an image sensor B 356B, a display 368, a processor 360, and/or other components.

One or more components of the image capture device may be the same as, be similar to, and/or correspond to one or more components of the system 10. For example, referring to FIG. 3A, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The display 308A may be the same as, be similar to, and/or correspond to the display 16. The housing may carry other components, such as the electronic storage 13. The image capture device may include other components not shown in FIGS. 3A and 3B. The image capture device may not include one or more components shown in FIGS. 3A and 3B. Other configurations of image capture devices are contemplated.

An optical element may include instrument(s), tool(s), and/or medium that acts upon light passing through the instrument(s)/tool(s)/medium. For example, an optical element may include one or more of lens, mirror, prism, and/or other optical elements. An optical element may affect direction, deviation, and/or path of the light passing through the optical element. An optical element may have a field of view (e.g., field of view 305 shown in FIG. 3A). The optical element may be configured to guide light within the field of view (e.g., the field of view 305) to an image sensor (e.g., the image sensor 306).

The field of view may include the field of view of a scene that is within the field of view of the optical element and/or the field of view of the scene that is delivered to the image sensor. For example, referring to FIG. 3A, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device may include multiple optical elements. The image capture device may include multiple optical elements that are arranged on the housing to capture spherical images/videos (guide light within spherical field of view to one or more images sensors). For instance, referring to FIG. 3B, the image capture device 352 may include two optical elements 354A, 354B positioned on opposing sides of the housing 362. The fields of views of the optical elements 354A, 354B may overlap and enable capture of spherical images and/or spherical videos.

An image sensor may include sensor(s) that converts received light into output signals. The output signals may include electrical signals. The image sensor may generate output signals conveying visual information that defines visual content of one or more images and/or one or more video frames of a video. For example, the image sensor may include one or more of a charge-coupled device sensor, an active pixel sensor, a complementary metal-oxide semiconductor sensor, an N-type metal-oxide-semiconductor sensor, and/or other image sensors.

The image sensor may be configured generate output signals conveying information that defines visual content of one or more images and/or one or more video frames of a video. The image sensor may be configured to generate a visual output signal based on light that becomes incident thereon and/or other information. The visual output signal may convey visual information that defines visual content having the field of view. For example, referring to FIG. 3A, the optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor may include conversion of light received by the image sensor into output signals/visual information defining visual content. Capturing visual content may include recording, storing, and/or otherwise capturing the visual content for use in previewing and/or generating video content (e.g., content of video frames). For example, during a capture duration, the visual output signal generated by the image sensor 306 and/or the visual information conveyed by the visual output signal may be used to record, store, and/or otherwise capture the visual content for use in previewing and/or generating video content.

In some implementations, the image capture device may include multiple image sensors. For example, the image capture device may include multiple image sensors carried by the housing to capture spherical images/videos based on light guided thereto by multiple optical elements. For instance, referring to FIG. 3B, the image capture device 362 may include two image sensors 356A, 356B configured to receive light from two optical elements 354A, 354B positioned on opposing sides of the housing 362.

A display may refer to an electronic device that provides visual presentation of information. A display may include a color display and/or a non-color display. In some implementations, a display may include one or more touchscreen displays. A display may be configured to visually present information. A display may be configured to present visual content, user interface, and/or other information. User interface (graphical user interface) may include a graphical form that enables a user to interact with the image capture device and/or see information provided by the image capture device. For example, referring to FIG. 3A, the display 308A and/or the display 308B may present preview of visual content being captured by the image capture device 302

(e.g., preview of visual content before and/or during recording), visual content that has been captured by the image capture device 302, setting information of the image capture device 302 (e.g., resolution, framerate, mode), and/or other information for the image capture device 302.

The display 308A (front-facing display) may enable a user to see visual content being captured by the image capture device 302, the user interface, the user interface elements, and/or other information while the image capture device 302 is pointed towards the user, such as when the user is in front of the image capture device 302. The display 308B (rear-facing display) may enable a user to see visual content being captured by the image capture device 302, the user interface, the user interface elements, and/or other information while the image capture device 302 is pointed away from the user, such as when the user is behind the image capture device 302. The display 308A may be smaller than the display 308B. In some implementations, the display 308A may have an aspect ratio of 1:1. In some implementations, the display 308A may have a different aspect ratio than the display 308B. For example, the display 308A may be a square display while the display 308B may be a wide/non-square display.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3A, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may provide previews of visual content captured by the image capture device 302. Previews of the visual content captured by the image capture device 302 may be presented on one or more displays (e.g., the display 308A, the display 308B, the display 368). The displays on which the previews are presented may be small. For example, the display 308A (front-facing display) of the image capture device 302 may be smaller than the display 308B (rear-facing display). Previews of visual content presented on the display 308A may be smaller than previews of visual content presented on the display 3088. For example, previews of visual content presented on the display 308B may be linearly scaled laterally and vertically (e.g., by 50% or more) to fit inside the display 308A. In some implementations, the display 308A may be a square display. The display 308A may have smaller size than 2 inch diagonal. As another example, the display 368 of the image capture device 352 may be small.

The small size of the display may result in small preview of the visual content on the display. Difference in aspect ratio of the display (e.g., 1:1 display) to the field of view of the visual content (e.g., 16:9 visual content) may result in further reduction in size of the preview on the display. For example, the image capture 302 may capture visual content at a 16:9 aspect ratio. To present the entirety of the visual content on the display, the visual content may be shrunk so that the width of the visual content extends across the width of the display while the height of the visual content is smaller than height of the display (e.g., presentation of the visual content includes black bars covering top and bottom portions of the display). Combination of the small size of the display and reduction in size to fit the entirety of the visual content onto the display may make it hard for users to make out details within the preview. Making out details may become more difficult as the user moves away from the image capture device 302. For instance, a user may be holding the image capture device 302 in front of the user and directed towards the user to capture wide-field of view selfie shots. Fitting the entire visual content within the display 308A may make it hard for user to figure out composition of the shots, such as how the user is positioned within the shots.

To assist the user, the image capture device 302 may present a portion-enlarged preview of the visual content on the display 308A (front-facing display). The portion-enlarged preview of the visual content may refer to a preview of the visual content in which a portion (extent) of the visual content has been enlarged for viewing. That is, the portion-enlarged preview of the visual content including an enlarged portion, and the extent of the visual content within the enlarged portion may be warped to increase size of depiction within the enlarged portion. The increase in size of depiction within the enlarged portion may be greater than in other portions of the preview. For example, one or more other portions may have been warped to increase the size of depiction, but the amount of magnification in those portion(s) may be less than in the enlarged portion. One or more other portions may have been warped to decrease the size of depiction, rather than warped to increase the size of depiction. In some implementations, different image projection may be used for the enlarged portion versus other portion of the preview. For example, a non-linear projection (in which straight lines appear as curved lines) may be used for the enlarged portion while a linear projection (in which straight lines appear as straight lines) may be used for other portions of the preview.

The enlarged portion may be a center portion or a non-center portion of the portion-enlarged preview. Using the center portion may facilitate users to better see details of the center target of the image capture device 302. Using a non-center portion may facilitate users to better see off-center target of the image capture device. The location of the enlarged portion within the portion-enlarged preview may be fixed or dynamic. For example, the location of the enlarged portion may be fixed, may be set based on user selection, may be set based on visual content analysis, and/or other information. In some implementations, the location of the enlarged portion may be determined based on detection of one or more things within the visual content. For example, the image capture device 302 may analyze visual content to determine whether a face is included within (depicted within) the visual content. Based on detecting a face within the visual content, the image capture device may position the enlarged portion so that the face is included within the enlarged portion. Such positioning of the enlarged portion may help users to make changes to the orientation/ positioning of the image capture device 302 to themselves to include proper framing of the face within the visual content.

Referring back to FIG. 1, the processor 11 (or one or more components of the processor 11) may be configured to obtain information to facilitate automatic control of display operation. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate providing warped previews. The machine-readable instructions 100 may include one or more computer program components. The machine-readable instructions 100 may include one or more of a capture component 102, a preview component 104, and/or other computer program components.

The capture component 102 may be configured to capture the visual content during one or more capture durations. A capture duration may refer to a time duration in which visual content is captured. The visual content may be captured through one or more optical elements (e.g., the optical element 14). For example, referring to FIG. 3A, the visual content may be captured through the optical element 304. Referring to FIG. 3B, the visual content may be captured through the optical element A 354A and/or the optical element B 354B. The visual content may have the field of view of the optical element(s).

Capturing visual content during a capture duration may include using, recording, storing, and/or otherwise capturing the visual content during the capture duration. For instance, visual content may be captured while the image capture device is operating in a record mode (e.g., video recording mode) and/or operating in a preview mode (e.g., showing preview of visual content to be captured on a display). The visual content may be captured for use in generating images and/or video frames. The images/video frames may be stored in electronic storage and/or deleted after use (e.g., after preview).

For example, during a capture duration, the capture component 102 may use the visual output signal generated by the image sensor 15 and/or the visual information conveyed by the visual output signal to record, store, and/or otherwise capture the visual content. For instance, the capture component 102 may store, in the electronic storage 13 and/or other (permanent and/or temporary) electronic storage medium, information (e.g., the visual information) defining the visual content based on the visual output signal generated by the image sensor 15 and/or the visual information conveyed by the visual output signal during the capture duration. In some implementations, information defining the captured visual content may be stored in one or more visual tracks. In some implementations, the information defining the visual content may be discarded. For instance, the visual information defining the visual content may be temporarily stored (e.g., in a buffer) to provide preview of the visual content, and the visual information may be deleted after the presentation of the preview.

The preview component 104 may be configured to present a portion-enlarged preview of the visual content on one or more displays (e.g., the display 16). The portion-enlarged preview of the visual content may refer to a preview of the visual content in which a portion (extent) of the visual content has been enlarged for viewing. The portion-enlarged preview of the visual content may include an enlarged portion. An extent of the visual content within the enlarged portion may be warped to increase size of depiction within the enlarged portion. Warping of the visual content within the enlarged portion may include manipulation of the pixels within the enlarged portion to distort/change shapes of things depicted within the enlarged portion.

The increase in size of depiction within the enlarged portion may be greater than in other portions of the portion-enlarged preview of the visual content. For example, one or more other portions may have been warped to increase the size of depiction within those portion(s), but the amount of increase in size (magnification) in those portion(s) may be less than in the enlarged portion. One or more other portions may have been warped to decrease the size of depiction in those portion(s), rather than warped to increase the size of depiction. Other warping of visual content is contemplated.

Small size of the display may require the visual content to be shrunk down for presentation on the display. For instance, the visual content may be linearly scaled down using rectilinear projection so that entirety of the visual content fits within the display. Such scaling down of the visual content for presenting on the display may make the details of the visual content smaller. Such scaling down of the visual content may make it hard for users to figure out, from the preview on the display, framing/composition of visual content being captured.

Warping of visual content within the enlarged portion may increase the size of depiction within the enlarged portion. Warping of the visual content within the enlarged portion may compensate for the small size of the display and for linear scaling of the visual content to fit within the display. Warping of the visual content within the enlarged portion may magnify thing(s) depicted within the enlarged portion. Warping of the visual content within the enlarged portion may not change the zoom level of the preview. That is, warping to increase size of depiction may be localized within the enlarged portion and the magnification of depiction within the enlarged portion may not push any pixels of the visual content off the display. Thus, the portion-enlarged preview of the visual content may include entirety of the visual content while magnifying the depiction of visual content within the portion-enlarged portion. That is, the portion-enlarged preview of the visual content may magnify depiction of things within the portion-enlarged portion without changing zoom of the whole image (preserving full field of view of the visual content).

In some implementations, a display on which the portion-enlarged preview is presented may be carried on the same side of the housing as the optical element through which the visual content is captured. For example, referring to FIG. 3A, the image capture device 302 may capture the visual content through the optical element 304, and the portion-enlarged preview of the visual content may be presented on the display 308A (e.g., front-facing display). Presentation of the portion-enlarged preview of the visual content on a front-facing display may enable a user to determine/change framing while capturing visual content. For example, a user may be able to determine whether a subject (e.g., target, user's face/body) is properly positioned within the visual content. If the subject is not visible within the portion-enlarged preview of the visual content, then the user may change orientation/positioning of the image capture device to the subject until the subject is visible and/or properly presented (e.g., without warping) within the portion-enlarged preview of the visual content.

Figure 4A:
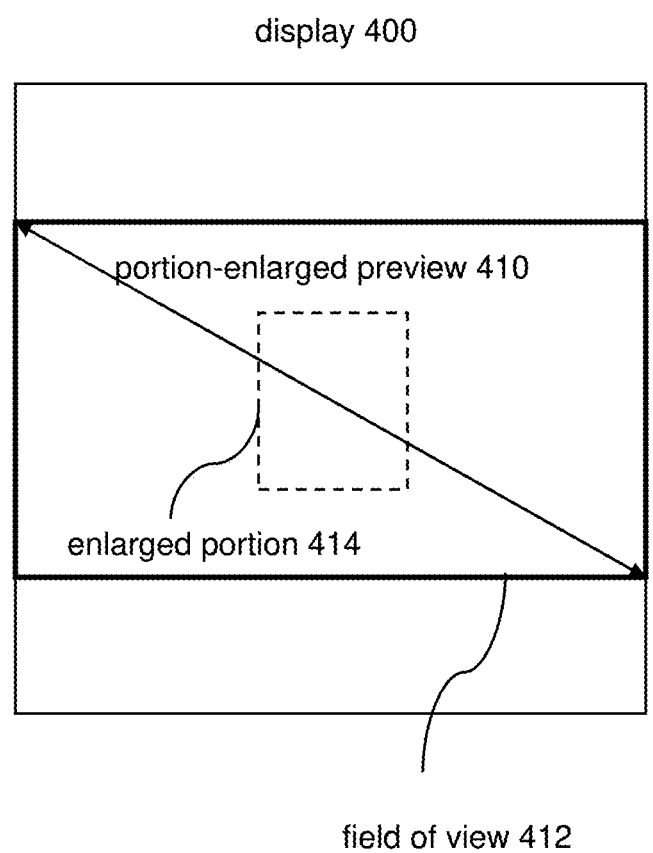
FIGS. 4A and 4B illustrate example portion-enlarged previews.
Figure 4B:
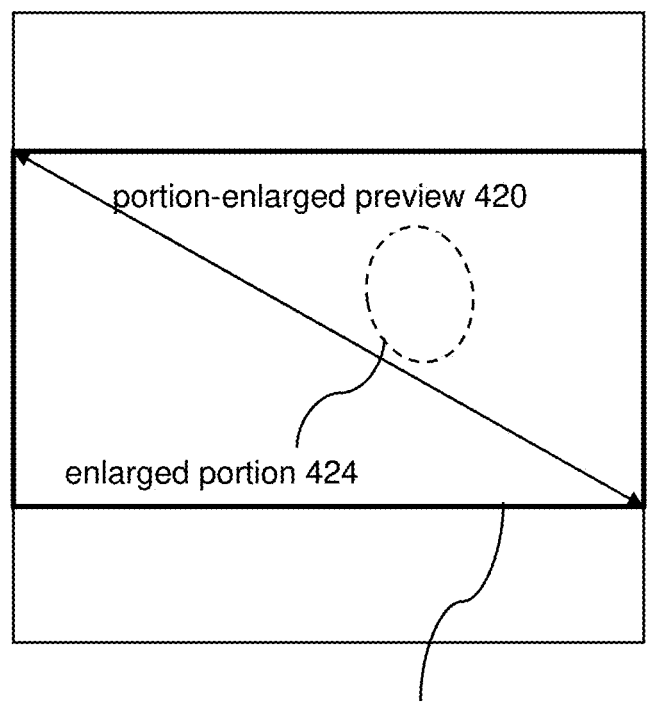

FIGS. 4A and 4B illustrate example portion-enlarged previews 410, 420 presented on a display 400. The aspect ratio of the portion-enlarged previews 410, 420 may match/be same as the aspect ratio of the visual content. The aspect ratio of the display 400 may be different from the aspect ratio of the portion-enlarged previews 410, 420. For example, the display 400 may have an aspect ratio of 1:1 while the portion-enlarged previews 410, 420/visual content may have an aspect ratio of 16:9. Other aspect ratio of displays and portion enlarged preview/visual content are contemplated.

In FIG. 4A, the portion-enlarged preview 410 may include a preview of visual content having a field of view 412. The portion-enlarged preview 410 may include an enlarged portion 414. The enlarged portion 414 may be a center portion of the portion-enlarged preview 410. An extent of the visual content within the enlarged portion 414 may be warped to increase size of depiction within the enlarged portion 414.

In FIG. 4B, the portion-enlarged preview 420 may include a preview of visual content having a field of view 422. The portion-enlarged preview 420 may include an enlarged portion 424. The enlarged portion 424 may be a non-center portion of the portion-enlarged preview 420. An extent of the visual content within the enlarged portion 424 may be warped to increase size of depiction within the enlarged portion 424.

While the enlarged portions 410, 420 are shown as having rectangular and circular shapes, respectively, these are merely as examples and are not meant to be limiting. Other shapes and sizes of enlarged portions are contemplated.

In some implementations, the position of the enlarged portion within the portion-enlarged preview may be determined based on position of a subject within the visual content. For example, a subject within the visual content may be a face. The position of the enlarged portion within the portion-enlarged preview of the visual content may be determined based on the position of the face within the visual content. The position of the enlarged portion within the portion-enlarged preview of the visual content may be determined to include the face within the enlarged portion. For example, the position of the enlarged portion 424 within the portion-enlarged preview 420 may be determined to include the face within the enlarged portion 424. Positioning of the enlarged portion 424 may include determination of translational and/or rotational position of the enlarged portion 424 to include the face within the enlarged portion 424 (e.g., align the face within the enlarged portion 424).

In some implementations, the extent of the visual content within the enlarged portion may be presented using a particular projection, and other extent of the visual content outside the enlarged portion may be presented using other projection(s) different than the projection used for the enlarged portion. For example, referring to FIG. 4A, a non-linear projection (in which straight lines appear as curved lines) may be used to present visual content within the enlarged portion 414 while a non-linear projection (in which straight lines appear as straight lines) may be used to present visual content outside the enlarged portion 414. Use of other projections is contemplated.

In some implementations, warping of the extent of the visual content within the enlarged portion may maintain the rule of thirds within the portion-enlarged preview of the visual content. Rule of thirds may refer to a rule/guideline in which an image is divided into thirds horizontally and vertical, results in nine parts. The rule of thirds may provide that placing points of interest in the intersections or along the dividing horizontal and vertical lines provides a more aesthetically pleasing view. The warping of the extent of the visual content within the enlarged portion may maintain the rule of thirds by not distorting depictions along the dividing horizontal and vertical lines. The warping of the extent of the visual content within the enlarged portion may maintain the rule of thirds by weighting the warping so that the division of rule of thirds parts is uniform.

Figure 5A:
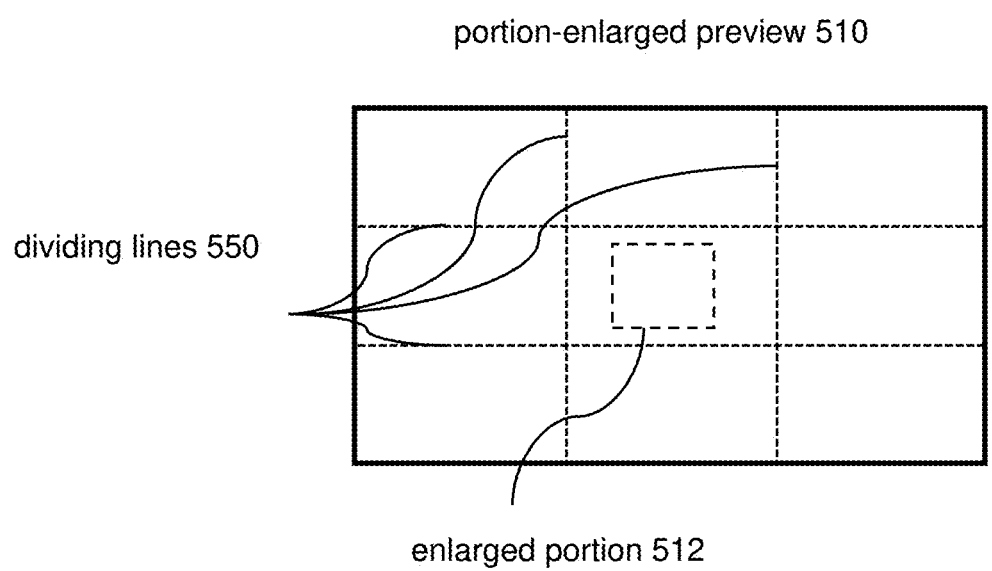
FIGS. 5A, 5B, and 5C illustrate example portion-enlarged previews.
Figure 5B:
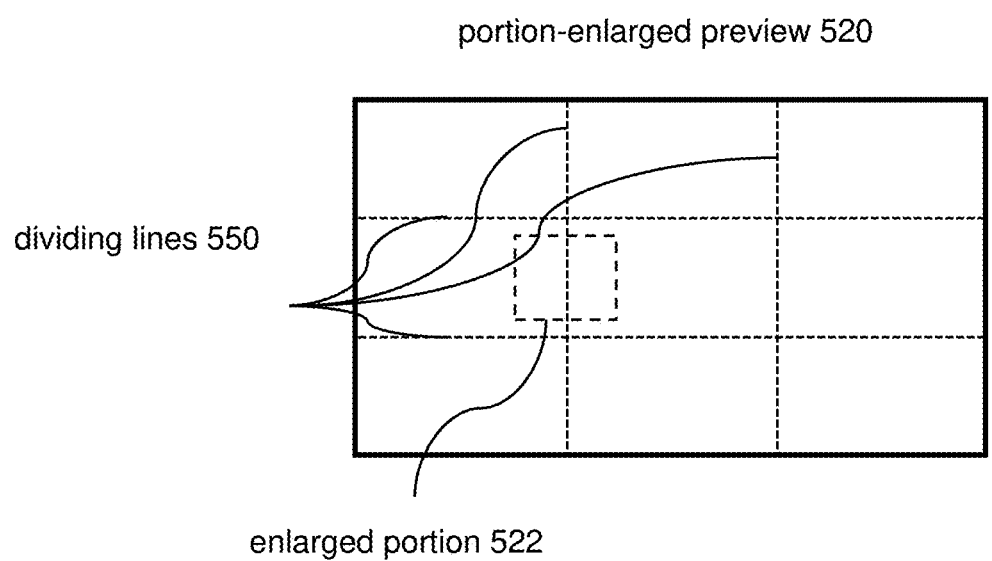
Figure 5C:
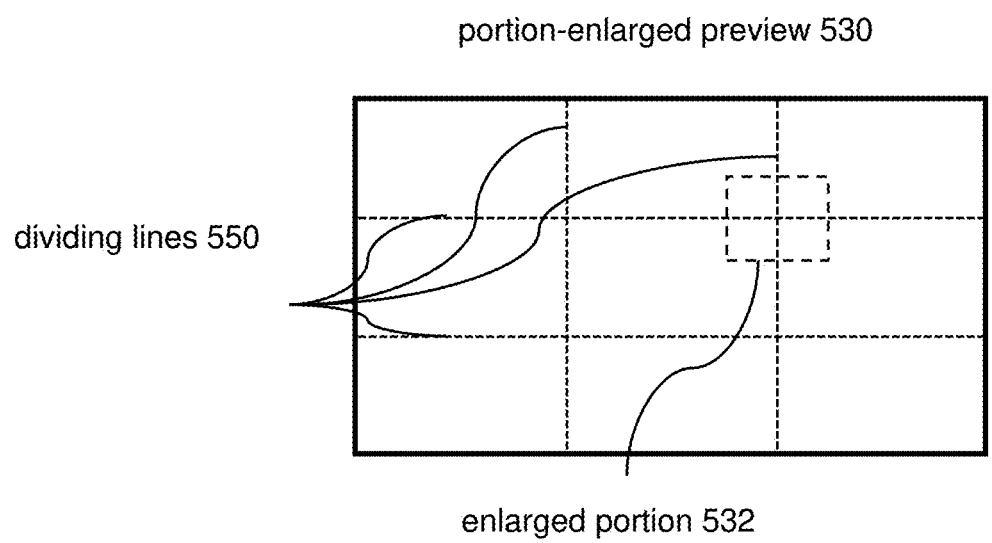

FIGS. 5A, 5B, and 5C illustrate example portion-enlarged previews. In FIGS. 5A, 5B, and 5C, the dividing horizontal and vertical lines may be shown as dividing lines 550, dividing portion enlarged previews 510, 520, 530 on a display 500 into nine parts. In FIG. 5A, an enlarged portion 512 may be located at the center of the portion-enlarged preview 510. The warping of visual content within an enlarged portion 512 may not affect pixels within the portion-enlarged preview 510 along the dashed lines 550.

In FIG. 5B, an enlarged portion 522 may be located on a left diving line. The warping of visual content within the enlarged portion 522 may not affect pixels within the portion-enlarged preview 520 along the dashed lines 550. For example, warping within the enlarged portion 522 may be constrained so that pixels along/adjacent to/near the left dividing line are not warped to left or right of the left dividing line. Warping of the visual content within the enlarged portion 522 to increase size of depiction within the enlarged portion 522 may not change position of thing(s) depicted along the left diving lines.

In FIG. 5C, an enlarged portion 522 may be located on an intersection of a top and right diving lines. The warping of visual content within the enlarged portion 532 may not affect pixels within the portion-enlarged preview 530 along the dashed lines 550. For example, warping within the enlarged portion 532 may be constrained so that pixels along/adjacent to/near the top dividing line are not warped above or below the top dividing line, and so that pixels along/adjacent to/near the right dividing line are not warped to left or right of the right dividing line. Warping of the visual content within the enlarged portion 532 to increase size of depiction within the enlarged portion 532 may not change position of thing(s) depicted at the intersection of the top and right diving lines. Other warping within the enlarged portion to maintain the rule of thirds within the portion-enlarged preview of the visual content are contemplated.

In some implementations, the portion-enlarged preview of the visual content may be presented on the display 16 responsive to a face and/or a person being within the visual content captured during the capture duration. Presenting the portion-enlarged preview of the visual content responsive to a face and/or a person being within the visual content may include using the display 16 to provide a view of the portion-enlarged preview. In some implementations, presenting the portion-enlarged preview of the visual content responsive to a face and/or a person being within the visual content may include turning on the display 16 and/or changing type of information presented on the display 16. For example, the display 16 may be turned off, and the preview component 104 may turn on the display 16 to present the portion-enlarged preview of the visual content. As another example, the display 16 may be turned on and presenting non-preview information (e.g., setting of the image capture device), and the preview component 104 may change display operation to present the portion-enlarged preview of the visual content.

In some implementations, the portion-enlarged preview of the visual content may not be presented on the display 16 responsive to a face and/or a person not being within the visual content captured during the capture duration. Not presenting the portion-enlarged preview of the visual content responsive to a face and/or a person not being within the visual content may include not using the display 16 to provide a view of the portion-enlarged preview. In some implementations, not presenting the portion-enlarged preview of the visual content responsive to a face and/or a person not being within the visual content may include turning off the display 16 and/or changing type of information presented on the display 16. For example, the display may be turned on and presenting preview (e.g., portion-enlarged preview) of visual content being captured by the image capture device, and the preview component 104 may turn off the display 16 to deactivate presentation of portion-enlarged preview on the display 16. As another example, the display 16 may be turned on and presenting preview of visual content being captured by the image capture device, and the preview component 104 may change display operation to present setting of the image capture device and/or other information on the display 16.

In some implementation, the portion-enlarged preview of the visual content may be automatically turned on based on face/person detection indicating that a person is viewing the display 16 and/or the person is in a position to view the display 16. The portion-enlarged preview of the visual content may be automatically turned off based on face/person detection indicating that a person is not viewing the display 16 and/or the person is not in a position to view the display 16.

Whether or not a face and/or a person is within the visual content may be determined based on analysis of the visual content and/or other information. The visual content captured by the capture component 102 may be analyzed to determine whether a face and/or a person is located within the visual content. Analysis of the visual content may include examination, evaluation, processing, studying, and/or other analysis of the visual content. For example, analysis of the visual content may include examination, evaluation, processing, studying, and/or other analysis of one or more visual features/characteristics of the visual content. Analysis of the visual content may include analysis of visual content of a single image and/or analysis of visual content of multiple images.

In some implementations, the image capture device may further comprise another display. The other display may be carried on a different side of the housing than the display 16. For example, the image capture device may include a front-facing display (on which the portion-enlarged preview is presented) and a rear-facing display. The portion-enlarged preview of the visual content may not be presented on the other display (e.g., rear-facing display) during presentation of the portion-enlarged preview of the visual content on the display 16 (e.g., front-facing display). In some implementations, the other display (e.g., rear-facing display) may be deactivated (e.g., turned off, put into sleep mode) during the presentation of the portion-enlarged preview of the visual content on the display 16 (e.g., front-facing display).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
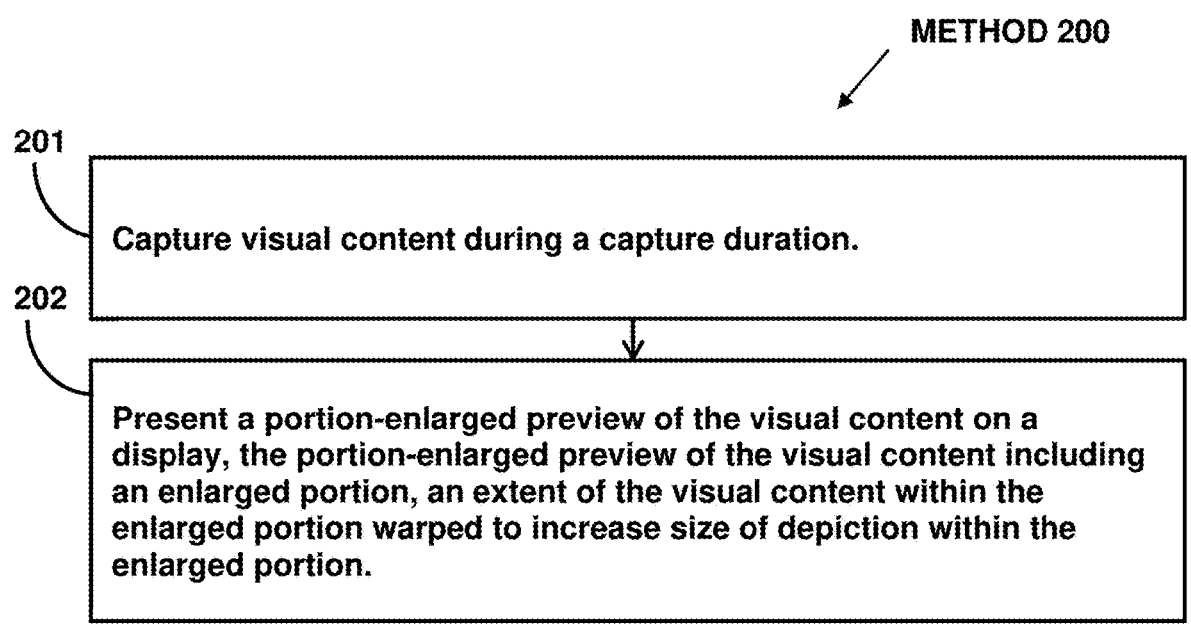
FIG. 2 illustrates an example method for providing warped previews operation.

FIG. 2 illustrates method 200 for providing warped previews. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may have multiple sides. The housing may carry one or more of an image sensor, an optical element, a display, and/or other components. The optical element may be carried on a first side of the housing. The optical element may guide light within a field of view to the image sensor. The image sensor may generate a visual output signal conveying visual information defining visual content based on light that becomes incident thereon. The display may be carried on the first side of the housing.

At operation 201, the visual content may be captured during a capture duration. In some implementation, operation 201 may be performed by a processor component the same as or similar to the capture component 102 (Shown in FIG. 1 and described herein).

At operation 202, a portion-enlarged preview of the visual content may be presented on the display. The portion-enlarged preview of the visual content may include an enlarged portion. An extent of the visual content within the enlarged portion may be warped to increase size of depiction within the enlarged portion. In some implementations, operation 202 may be performed by a processor component the same as or similar to the preview component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for providing warped previews, the image capture device comprising:
   a housing having multiple sides;
   an image sensor carried by the housing and configured to generate a visual output signal conveying visual information based on light that becomes incident thereon, the visual information defining visual content;
   an optical element carried on a first side of the housing, the optical element configured to guide light within a field of view to the image sensor;
   a first display carried on the first side of the housing;
   one or more physical processors carried by the housing, the one or more physical processors configured by machine-readable instructions to:
      capture the visual content during a capture duration; and
      present a portion-enlarged preview of the visual content on the first display, the portion-enlarged preview of the visual content including an enlarged portion, an extent of the visual content within the enlarged portion warped to increase size of depiction within the enlarged portion by distorting shape of things depicted within the enlarged portion, wherein warping of the visual content within the enlarged portion is constrained to maintain rule of thirds within the portion-enlarged preview of the visual content by not warping pixels located along dividing lines that divide the visual content into thirds.

2. The image capture device of claim 1, wherein the portion-enlarged preview of the visual content includes entirety of the visual content.

3. The image capture device of claim 1, wherein the enlarged portion is a center portion of the portion-enlarged preview of the visual content.

4. The image capture device of claim 1, wherein the visual content includes a face, and position of the enlarged portion within the portion-enlarged preview of the visual content is determined to include the face within the enlarged portion.

5. The image capture device of claim 1, wherein not warping the pixels located along the dividing lines that divide the visual content into thirds includes not changing position of things depicted along the dividing lines, further wherein:
responsive to the enlarged portion including a vertical dividing line, pixels located along the vertical dividing line are not warped to left or right of the vertical dividing line; and
responsive to the enlarged portion including a horizontal dividing line, pixels located along the horizontal dividing line are not warped to above or below the horizontal dividing line.

6. The image capture device of claim 1, wherein the extent of the visual content within the enlarged portion is presented using a non-linear projection to cause straight lines to appear curved in the enlarged portion, and other extent of the visual content outside the enlarged portion is presented using a linear projection to cause straight lines to appear straight outside the enlarged portion.

7. The image capture device of claim 1, further comprising a second display carried on a second side of the housing, wherein the portion-enlarged preview of the visual content is not presented on the second display during presentation of the portion-enlarged preview of the visual content on the first display.

8. The image capture device of claim 7, wherein the second display is deactivated during the presentation of the portion-enlarged preview of the visual content on the first display.

9. The image capture device of claim 1, wherein the portion-enlarged preview of the visual content is presented on the first display responsive to a face or a person being within the visual content captured during the capture duration.

10. A method for providing warped previews, the method performed by an image capture device including one or more processors, a housing having multiple sides, an image sensor carried by the housing and configured to generate a visual output signal conveying visual information based on light that becomes incident thereon, the visual information defining visual content, an optical element carried on a first side of the housing, the optical element configured to guide light within a field of view to the image sensor, and a first display carried on the first side of the housing, the method comprising:
capturing the visual content during a capture duration; and
presenting a portion-enlarged preview of the visual content on the first display, the portion-enlarged preview of the visual content including an enlarged portion, an extent of the visual content within the enlarged portion warped to increase size of depiction within the enlarged portion by distorting shape of things depicted within the enlarged portion, wherein warping of the visual content within the enlarged portion is constrained to maintain rule of thirds within the portion-enlarged preview of the visual content by not warping pixels located along dividing lines that divide the visual content into thirds.

11. The method of claim 10, wherein the portion-enlarged preview of the visual content includes entirety of the visual content.

12. The method of claim 10, wherein the enlarged portion is a center portion of the portion-enlarged preview of the visual content.

13. The method of claim 10, wherein the visual content includes a face, and position of the enlarged portion within the portion-enlarged preview of the visual content is determined to include the face within the enlarged portion.

14. The method of claim 10, wherein not warping the pixels located along the dividing lines that divide the visual content into thirds includes not changing position of things depicted along the dividing lines, further wherein:
responsive to the enlarged portion including a vertical dividing line, pixels located along the vertical dividing line are not warped to left or right of the vertical dividing line; and
responsive to the enlarged portion including a horizontal dividing line, pixels located along the horizontal dividing line are not warped to above or below the horizontal dividing line.

15. The method of claim 10, wherein the extent of the visual content within the enlarged portion is presented using a non-linear projection to cause straight lines to appear curved in the enlarged portion, and other extent of the visual content outside the enlarged portion is presented using a linear projection to cause straight lines to appear straight outside the enlarged portion.

16. The method of claim 10, wherein the image capture device further includes a second display carried on a second side of the housing, and the portion-enlarged preview of the visual content is not presented on the second display during presentation of the portion-enlarged preview of the visual content on the first display.

17. The method of claim 16, wherein the second display is deactivated during the presentation of the portion-enlarged preview of the visual content on the first display.

18. The method of claim 10, wherein the portion-enlarged preview of the visual content is presented on the first display responsive to a face or a person being within the visual content captured during the capture duration.

19. An image capture device for providing warped previews, the image capture device comprising:
a housing having multiple sides;
an image sensor carried by the housing and configured to generate a visual output signal conveying visual information based on light that becomes incident thereon, the visual information defining visual content;
an optical element carried on a first side of the housing, the optical element configured to guide light within a field of view to the image sensor;
a first display carried on the first side of the housing;
one or more physical processors carried by the housing, the one or more physical processors configured by machine-readable instructions to:
capture the visual content during a capture duration; and
present a portion-enlarged preview of the visual content on the first display, the portion-enlarged preview of the visual content including entirety of the visual content, the portion-enlarged preview of the visual content including an enlarged portion, an extent of the visual content within the enlarged portion warped to increase size of depiction within the enlarged portion by distorting shape of things depicted within the enlarged portion, wherein warping of the visual content within the enlarged portion is constrained to maintain rule of thirds within the portion-enlarged preview of the visual content by not warping pixels located along dividing lines that divide the visual content into thirds;

wherein the extent of the visual content within the enlarged portion is presented using a non-linear projection to cause straight lines to appear curved in the enlarged portion, and other extent of the visual content outside the enlarged portion is presented using a linear projection to cause straight lines to appear straight outside the enlarged portion.

20. The image capture device of claim 19, wherein not warping the pixels located along the dividing lines that divide the visual content into thirds includes not changing position of things depicted along the dividing lines, further wherein:

responsive to the enlarged portion including a vertical dividing line, pixels located along the vertical dividing line are not warped to left or right of the vertical dividing line; and responsive to the enlarged portion including a horizontal dividing line, pixels located along the horizontal dividing line are not warped to above or below the horizontal dividing line.

* * * * *